March 24, 1953   J. J. COLEMAN ET AL   2,632,783
METHOD OF MAKING DRY CELLS AND BATTERIES
Original Filed Dec. 16, 1948
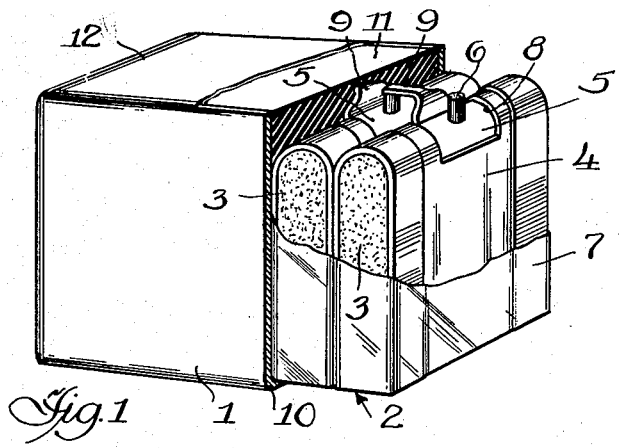
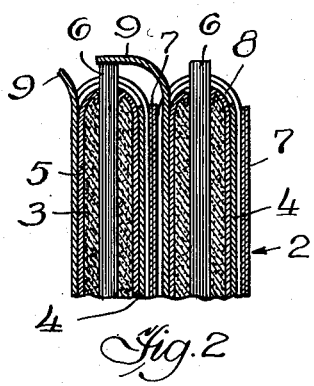
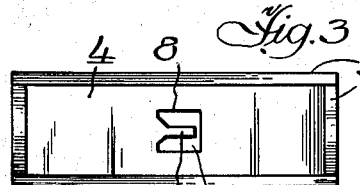
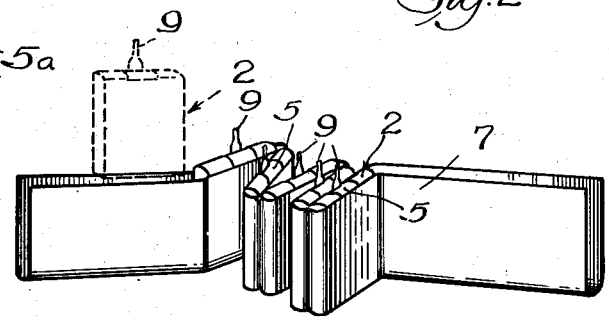
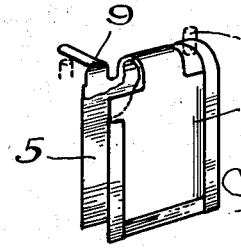
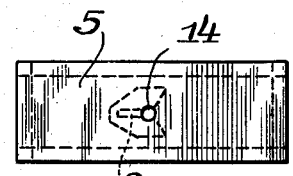
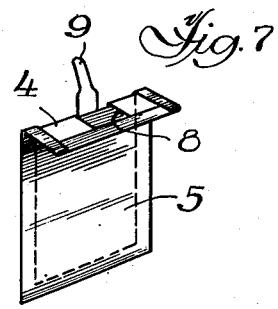
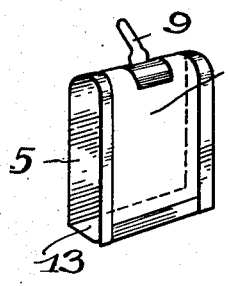
INVENTORS.
Joseph J. Coleman
and Milton E. Wilke, Patented Mar. 24, 1953

2,632,783

UNITED STATES PATENT OFFICE 2,632,783

METHOD OF MAKING DRY CELLS AND BATTERIES

Joseph J. Coleman and Milton E. Wilke, Freeport, Ill., assignors to Burgess Battery Company, Freeport, Ill., a corporation of Delaware Original application December 16, 1948, Serial No. 65,591. Divided and this application October 24, 1950, Serial No. 191,782

6 Claims. (Cl. 136—111)

This invention relates to electric dry cells and batteries, and more particularly to an improved method of making the same. This application is a division of application Serial No. 65,591, filed December 16, 1948.

The electric output capacity of a dry cell and the ability of the cell to deliver a heavy sustained current depend, in part, upon the quantities of chemical reactants in the cell and the arrangement of the elements in the cell structure. The efficient use of space results in the production of a cell having satisfactory electrical capacity when the participating chemical substances are properly proportioned and the cell elements are arranged for proper access to each other with resulting efficient interaction.

Generally speaking, the current output of a cell of the Le Clanche type may be increased by increasing the area of the negative electrode which is exposed to electrolytic action in the process of generating electricity. By so increasing the area of the negative electrode, the polarization effect is diminished or retarded and the internal resistance of the cell reduced.

Referring to the flat type of cell in which the negative electrode is formed principally by a flat area, and the depolarizing mass or mix is in the shape of a flat slab or block, it has heretofore been proposed to employ a flanged negative electrode member which covers more than one flat surface of the mix block. Electrodes having a U shape wherein the portion connecting the two legs of the electrode forms the bottom of the cell have also been proposed and have been used. Other more complex electrode structures which more or less completely enclose the mix block have been suggested. Where the simpler elements are employed in cells having terminals at the tops thereof for electrical connection to form a battery, the tops of the cells have been left open with the mix block and portions of the negative electrode and separator exposed to be covered at a later stage in the production process by a sealing material. This arrangement requires the observation of certain tolerances in the construction of the elements and their arrangement in the cell. Extra precautions must be taken to avoid the possibility of the short-circuiting of the cell by a mix crumb which makes contact with the negative electrode above the separator.

The invention described in the copending application above referred to provides a cell and battery of high capacity capable of delivering a relatively large current over a sustained period. The principal object of that invention is to provide such a cell and battery having a simple construction which avoids the necessity of maintaining certain close tolerances and which is not susceptible to short-circuiting in the manner above described. More specifically stated, the object of that invention is to provide a dry cell having a large active anode area and a top which is covered by active elements of the cell which are capable of confining the mix to its proper location within the cell.

The object of the invention herein described and claimed is to provide a method of making dry cells of the flat type having a covering sheet extending over the top thereof.

Other advantages and objects of the invention will become apparent as the description thereof proceeds.

In the accompanying drawing:

Fig. 1 is a perspective view of a battery structure, partly broken away, embodying the invention;

Fig. 2 is a cross-sectional view of a portion of the battery of Fig. 1;

Fig. 3 is a plan view of the negative electrode assembly of the cells shown in Figs. 1 and 2;

Fig. 4 illustrates, in perspective, a group of cells at one stage in the construction of the battery of Fig. 1;

Figs. 5, 6 and 7 are perspective views of alternative forms of negative electrode assemblies embodying the invention; and Fig. 8 is a plan view of a further alternative form of negative electrode assembly.

The invention contemplates a cell having a negative electrode of sheet metal which covers at least one broad surface of the flat mix block and extends over the top of the mix block to form the top of the cell. In all cases, an opening is provided in this top portion of the negative electrode, the separator element spans this opening, and the positive terminal projects through the separator and opening at the top of the cell for connection with other cells of the battery or to the external circuit.

Referring to the drawing, battery 1 is composed of a sufficient number of cells 2 to furnish the voltage desired of the battery. Each cell 2 contains a block 3 of mix having the known and usual composition, a negative electrode 4 of zinc, magnesium, or other suitable material, a bibulous separator 5, also of known composition and function, and a suitable positive terminal 6 which may be the usual carbon rod. Except for the top, the cell so constituted is completely enclosed within a pocket or envelope 7 of a suitable film material, such as the product sold under the trade-mark "Pliofilm," which is resistant to the action of the chemical substances of the cell fluids and is electrically non-conductive As best shown in Figs. 1 and 2, the negative electrode of this cell structure is U-shaped and is arranged in the cell in inverted position so that the portion of the U-shaped element which joins the two legs thereof, the bend of the U, forms the top of the cell. The sides of this electrode are open; that is, the two leg portions are substantially coextensive and coterminous with the broad surfaces of the mix block 3, leaving the side edges thereof uncovered by the electrode. An opening 8 is provided in the top portion of the electrode exposing the portion of the bibulous separator element 5 which underlies and spans the opening. Thus, the entire top of the cell is covered either by the separator element 5 alone or by a portion of the negative electrode in addition to the separator. Mix block 3 is not exposed at the top of the cell.

The negative electrode assembly is illustrated in Fig. 3 in the form in which it appears before being bent to the shape in which it is used in the cell. This assembly, which includes separator element 5, is formed from a rectangular blank of sheet metal. Opening 8 is punched at the proper location at the middle of the blank, a lug 9 being left for the purposes hereinafter described. The bibulous separator element, which may be a sheet of starch-coated paper, for example, is then laid upon the punched blank and the marginal portions 5a of the separator turned back over the edges of the blank to overlap the marginal portions of the blank on the side opposite to that covered by the separator. This electrode assembly is then ready to be formed to the shape in which it will be used in the cell wherein the separator element 5 will form a lining for the electrode 4 to separate the same from the mix block 3.

In assembling the cell, the mix is inserted between the legs of the formed electrode. This may be done by directly extruding a slug of the material into the space between the legs of the electrode, or pre-formed blocks of mix may be inserted in any manner suited to production techniques. It is not necessary to observe the usual close tolerances in carrying out this operation since the electrode assembly itself establishes the limit of insertion of the mix material into the cell. The carbon rod positive terminal 6 is then inserted by driving the rod through the separator 5 in the opening 8 of the negative electrode. It is not necessary to provide a hole in the separator for this purpose when the proper material, such as paper of suitable strength, is used as the separator element, the mix being sufficiently firm to support the separator as the carbon is driven through. Insertion of the carbon terminal in this manner insures a close fit between the rod and the separator so that no opening is left through which the mix may pass. If desired, the carbon rods may be pointed to more readily pierce the separator, but this is not necessary.

Each cell is finally placed in a pocket or envelope 7 of a suitable film material which covers the four sides and the bottom of each cell. A convenient method for providing such a covering for the cells is indicated in Fig. 4 showing a continuous trough of film material into which the cells are inserted, the two sides of the trough being brought together and sealed between adjacent cells. If the cells have been properly spaced and oriented in carrying out this process, the string of cells so formed may be brought together in juxtaposed relationship by accordion folding the string, as indicated in the drawing.

If desired, insertion of carbon rods 6 may be deferred until after the cells have been covered by the film material.

In fabricating the battery from the cells thus produced, the desired number of cells may be placed within a tray 10 and electrically interconnected by means of lugs 9 which may be bent to engage the positive terminal of the adjacent cell. A suitable thermoplastic sealing material 11 may then be poured upon the tops of the cells and a final moisture-proof coating 12 may be applied, if desired, by dipping the entire sealed unit in microcrystalline wax or other suitable moisture resistant coating material. Suitable means, not shown, must, of course, have been provided for bringing out the battery terminals for connection to an external circuit.

It is desirable that the cell elements be held together firmly to provide good physical contact between mix, separator, and negative electrode. One function of tray 10 is to serve this purpose. The rounded tops of electrodes 4 permit any necessary flexing as the cells are brought together under some pressure and inserted in the tray.

Alternatively, the juxtaposed cells may be held together by tape which also serves as a protective covering. With this arrangement, properly applied, the tray and top seal may be eliminated, a single dip in microcrystalline wax, bi-wax, or other suitable material sufficing to complete and seal the battery unit.

Numerous alternative forms of negative electrode may be employed without departing from the principle of the invention. Examples of such alternative forms are illustrated in Figs. 5–8.

In the negative electrode 4 illustrated in Fig. 5, an opening is provided at each side of the electrode instead of a single opening in the middle portion in the manner described above. This arrangement has the advantage of providing greater separation between terminal lug 9 and the positive terminal of the cell, the eventual location of which is shown at 6 in dotted lines. This is particularly desirable in small cells for the reason that the top sealing material may more readily and completely cover and seal the elements when so separated. As in the case of the cells of Figs. 1 and 2, the entire top of the cell in which the form of electrode of Fig. 5 is employed will be covered by the separator element and, in part, by a portion of the negative electrode.

The electrode assembly illustrated in Fig. 6 is similar to that of Fig. 1, the difference being the addition of a bottom flange 13 which extends from the end of one leg of the electrode and is intended to underlie and support the mix block at the bottom of the cell. This flange increases the active area of the electrode and leaves only the two narrow sides of the mix block of the cell uncovered.

The electrode 4 of Fig. 7 consists of only one side and a top portion. This electrode, while simpler than that of the other embodiments of the invention, provides the desired top covering for the mix block and thereby achieves the principal object of the invention.

Where it is desired to employ a separator element which is of such strength that it is not possible to pierce it by the carbon rod in the manner above described, a small opening 14 may be punched in the separator at the eventual location of the carbon terminal of the cell, as shown in the electrode assembly of Fig. 8.

From the examples given, many other modified forms of the invention will occur to those skilled in the art and no attempt is made herein to describe all possibilities.

Invention is claimed as follows:

1. The method of making a dry cell which comprises the steps of covering with contact engagement a surface, including the top surface, of a solid mix block with a bibulous separator element and thereafter inserting a rod-like positive terminal at the top of the cell by forcing said terminal lengthwise through the separator to rupture the same and into the solid mix block.

2. The method of making a dry cell which comprises the steps of lining a U-shaped negative electrode with a sheet-form bibulous separator element, inserting a solid mix block between the legs of said electrode into contact engagement with said separator element, and thereafter inserting a rod-like positive terminal by moving said terminal lengthwise through an opening in said electrode and through said separator element to rupture the same and into said solid mix block.

3. The method of making a dry cell which comprises the steps of lining a U-shaped negative electrode with a sheet-form bibulous separator element, inserting a solid mix block between the legs of said electrode into contact engagement with said separator element, applying an envelope of film material to the assembly leaving that portion of the electrode which connects the two legs thereof exposed, and thereafter inserting a rod-like positive terminal into the cell by forcing said terminal lengthwise through an opening in said electrode and through said separator element to rupture the same and into said solid mix block.

4. The method of making a dry cell which comprises assembling a solid mix block, negative electrode, and bibulous separator elements of the cell, enclosing the cell within an envelope of film material having an opening therein, and thereafter inserting a rod-like positive terminal element into the cell by passing one end thereof through said opening in the film material and a registering opening in said negative electrode and piercing the separator element with said end of said terminal element by forcing the latter lengthwise through said separator element and continuing the lengthwise movement to drive the terminal element into the solid mix block of the cell.

5. In a method of making a dry battery, the steps of lining U-shaped negative electrodes with sheet-form bibulous separator elements, inserting a solid mix block between the legs of each said electrode into contact engagement with said separator element, applying an envelope of film material to each unit so assembled leaving that portion of the electrode of each unit which connects the two legs thereof exposed, arranging the units in juxtaposed relation, and thereafter inserting a rod-like positive terminal into each unit by forcing said terminals lengthwise through openings in said electrodes and through the separator elements to rupture the same and into the solid mix blocks.

6. In the method of making a dry cell, the steps which comprise lining the surface of a metal negative electrode having an opening therein with a sheet-form bibulous separator member in such manner that said separator member spans said opening, arranging a solid mix block in contact with the surface of said separator member remote from said negative electrode, and pushing a rod-like positive terminal lengthwise through said opening in said negative electrode, through said separator member, rupturing the same, and into said solid mix block.

JOSEPH J. COLEMAN.
MILTON E. WILKE.

REFERENCES CITED

The following references are of record in the file of this patent:

UNITED STATES PATENTS

| Number | Name | Date |
| --- | --- | --- |
| 738,025 | Gill | Sept. 1, 1903 |
| 1,484,926 | Benner | Feb. 26, 1924 |
| 1,510,364 | Weissmann | Sept. 30, 1924 |
| 1,766,418 | Weissmann | June 24, 1930 |
| 2,175,686 | Eddy | Oct. 10, 1939 |
| 2,463,089 | Deibel | Mar. 1, 1949 |

FOREIGN PATENTS

| Number | Country | Date |
| --- | --- | --- |
| 128,012 | Great Britain | June 16, 1919 |
| 505,515 | France | July 31, 1920 |